(12) United States Patent
Hanamura et al.

(10) Patent No.: US 8,390,532 B2
(45) Date of Patent: Mar. 5, 2013

(54) VIDEO DISPLAY APPARATUS AND VIDEO DISPLAY METHOD

(75) Inventors: Toshiaki Hanamura, Chiyoda-ku (JP); Takashi Okamoto, Chiyoda-ku (JP); Hideki Aso, Chiyoda-ku (JP); Kazuya Maeshima, Chiyoda-ku (JP); Kenji Morimoto, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 968 days.

(21) Appl. No.: 12/514,392

(22) PCT Filed: Mar. 26, 2007

(86) PCT No.: PCT/JP2007/056198
§ 371 (c)(1),
(2), (4) Date: May 11, 2009

(87) PCT Pub. No.: WO2008/117393
PCT Pub. Date: Oct. 2, 2008

(65) Prior Publication Data
US 2010/0053450 A1    Mar. 4, 2010

(51) Int. Cl.
*G09G 5/00* (2006.01)
*G09G 3/30* (2006.01)

(52) U.S. Cl. ............................ 345/1.1; 345/78

(58) Field of Classification Search .............. 345/1.1–6
See application file for complete search history.

(56) References Cited

U.S. PATENT DOCUMENTS

| | | | |
|---|---|---|---|
| 6,115,092 A | 9/2000 | Greene et al. | |
| 6,243,059 B1 | 6/2001 | Greene et al. | |
| 6,292,157 B1 * | 9/2001 | Greene et al. | 345/1.3 |
| 7,239,367 B2 * | 7/2007 | Jin et al. | 349/159 |
| 7,336,277 B1 * | 2/2008 | Clark et al. | 345/426 |
| 7,489,286 B2 * | 2/2009 | Kawase et al. | 345/1.1 |
| 2002/0171608 A1 * | 11/2002 | Kanai et al. | 345/55 |
| 2006/0028687 A1 * | 2/2006 | Karaki | 358/3.01 |
| 2006/0114172 A1 * | 6/2006 | Shivji | 345/1.1 |

FOREIGN PATENT DOCUMENTS

| | | |
|---|---|---|
| CN | 1396616 | 2/2003 |
| EP | 1 612 658 | 1/2006 |

(Continued)

OTHER PUBLICATIONS

Supplementary European Search Report issued in the corresponding Application No. 07739636.4-2205 dated Mar. 10, 2010.

(Continued)

*Primary Examiner* — Alexander Eisen
*Assistant Examiner* — Patrick F Marinelli
(74) *Attorney, Agent, or Firm* — Buchanan Ingersoll & Rooney PC

(57) ABSTRACT

There is provided a video display apparatus the display screen of which is configured by combining a plurality of video display units in each of which light emitting display elements are arranged in a matrix manner; in the video display apparatus, there is provided a luminance correction means that corrects the luminance of video data situated in a correction subject area including respective end regions, of a first video display unit and a second video display unit, that face each other, in accordance with the spacing between the first video display unit and the second video display unit; and a linear noise that is caused at a seam portion between the video display units is suppressed, whereby the image quality of a video to be displayed can be raised.

7 Claims, 8 Drawing Sheets

FOREIGN PATENT DOCUMENTS

| | | |
|---|---|---|
| JP | 08-184850 A | 7/1996 |
| JP | 10-254378 A | 9/1998 |
| JP | 2003-022037 A | 1/2003 |
| JP | 2004-086165 A | 3/2004 |
| JP | 2004-302087 A | 10/2004 |
| JP | 2005-301133 A | 10/2005 |

OTHER PUBLICATIONS

Office Action dated Sep. 14, 2010, issued in the corresponding Chinese Patent Application No. 200780049270.X, with an English and Japanese description thereof.
PCT/ISA/210 mailed Apr. 17, 2007.

* cited by examiner (a)

(b) REARRANGEMENT OF MODULES

VIDEO DISPLAY APPARATUS AND VIDEO DISPLAY METHOD

TECHNICAL FIELD

The present invention relates to a video display apparatus configured by combining a plurality of video display units and a video display method therefor.

BACKGROUND ART

The demand for a large-size video display apparatus utilizing light emitting display elements (or simply referred to as light emitting elements) such as light emitting diodes has rapidly been increased, because, due to development of devices, the image quality and the resolution thereof have recently been raised and the pixel pitch thereof has been reduced.

A large-size video display apparatus utilizing light emitting display elements is configured by combining a plurality of video display units formed of a great number of light emitting display elements that are arranged in a matrix manner on a substrate.

Furthermore, it is made possible that, by combining two or more video display units so as to configure a module and arbitrarily combining the modules, a large, desired-size video display apparatus is configured.

In the case of such a large-size video display apparatus configured of a plurality of video display units that are combined with one another, when the resolution of a video to be displayed is raised, the spacing (distance) between the video display units affects the image quality of a video to be displayed.

In a conventional large-size video display apparatus (for example, refer to a display apparatus disclosed in Japanese Patent Application Laid-Open No. 2004-86165) obtained by arranging a great number of video display units so as to configure a large-screen display apparatus, in order to make the brightness variations in the video display units and the seam between the video display units inconspicuous and to raise the image quality, the brightness of dots in the vicinity of the seam is set to be higher than that of dots in the vicinity of the middle portion, regardless of the spacing between the video display units.

Patent Document 1: Japanese Patent Publication Laid-Open No. 2004-86165 (paragraph 0289)

DISCLOSURE OF THE INVENTION

Problems to be Solved by the Invention

In general, in the case of a large-size video display apparatus utilizing a plurality of video display units, the dot spacing (i.e., the spacing between the light emitting display elements) in the vicinity of the seam portion between the video display units is liable to become uneven, whereby a linear noise is seen in the vicinity of the seam portion.

The linear noise tends to look bright when the spacing between the video display units is too small, and to look dark when the spacing between the video display units is too large.

By precisely arranging the video display units in such a way that the spacing between the adjacent video display units is the same as the dot spacing in the video display unit, the linear noise can be suppressed; however, the smaller the pixel pitch (i.e., the distance between pixels that are formed of a light emitting display element) of the video display unit becomes, the higher the required preciseness of the arrangement becomes.

Accordingly, there has been a problem that unevenness in the spacing between the video display units causes a linear noise at the seam portion between the video display units.

In the case of a large-size video display apparatus utilizing transportable modules that are each configured by combining a plurality of video display units, due to a change in the installation place or a change in the screen (video display screen) size, there often occurs a case where the modules are recombined and rearranged.

Accordingly, in the case of a large-size video display apparatus utilizing transportable modules, it is difficult to arrange the modules in such a way that the spacing between the modules is accurate; thus, the spacing between the modules is liable to change and become uneven.

As a result, there has been a problem that a linear noise is caused at the seam portion between the modules.

In Japanese Patent Application Laid-Open No. 2004-86165 (Patent Document 1), there is described a method in which, by setting the brightness of dots (light emitting display elements) in the vicinity of the seam between video display units to be higher than that of dots at the middle portion, the seam between the video display units is made inconspicuous.

However, this method is not effective in suppressing a dark-and-bright linear noise caused by the spacing between the video display units.

There exists no method of suppressing a bright linear noise that appears when the spacing between the video display units is small, and no specific measures are established.

The present invention has been implemented in order to solve the foregoing problems; the objective thereof is to provide a video display apparatus that is configured by combining a plurality of video display units or modules and in which a dark-and-bright linear noise that appears at the seam portion between the video display units or modules can be reduced.

Additionally, another objective thereof is to provide a method capable of reducing a dark-and-bright linear noise that appears at the seam portion between the video display units or modules.

Means for Solving the Problems

In a video display apparatus according to the present invention, the display screen thereof is configured by combining a plurality of video display units in each of which light emitting display elements are arranged in a matrix manner; the video display apparatus is provided with a luminance correction means that corrects the luminance of video data situated in respective correction subject areas, of a first video display unit and a second video display unit, that are end regions facing each other, in accordance with the spacing between the first video display unit and the second video display unit.

Moreover, in a video display apparatus according to the present invention, the display screen thereof is configured by combining modules that are each configured with a plurality of video display units; the video display apparatus is provided with a luminance correction means that corrects the luminance of video data situated in a correction subject area including respective end regions, of a first module and a second module, that face each other, in accordance with the spacing between the first module and the second module.

Still moreover, in a video display method according to the present invention, the display screen thereof is configured by combining a plurality of video display units in each of which light emitting display elements are arranged in a matrix manner; the video display method is to correct the luminance of video data situated in respective correction subject areas, of a first video display unit and a second video display unit, that are end regions facing each other, in accordance with the spacing between the first video display unit and the second video display unit.

Furthermore, in a video display method according to the present invention, the display screen thereof is configured by combining modules that are each configured with a plurality of video display units; the video display method is to correct the luminance of video data situated in a correction subject area including respective end regions, of a first module and a second module, that face each other, in accordance with the spacing between the first module and the second module.

ADVANTAGES OF THE INVENTION

According to the present invention, it is made possible to adjust the luminance of video data situated in the respective end regions, of the adjacent first and second video display units, that face each other; therefore, it is made possible to suppress a linear noise that is caused at a seam portion between the video display units, whereby the image quality of a video to be displayed can be raised.

Moreover, according to the present invention, it is made possible to adjust the luminance of video data situated in the respective end regions, of the adjacent first and second modules, that face each other; therefore, it is made possible to suppress a linear noise that is caused at a seam portion between the video display modules, whereby the image quality of a video to be displayed can be raised.

DESCRIPTION OF REFERENCE NUMERALS

Figure 1:
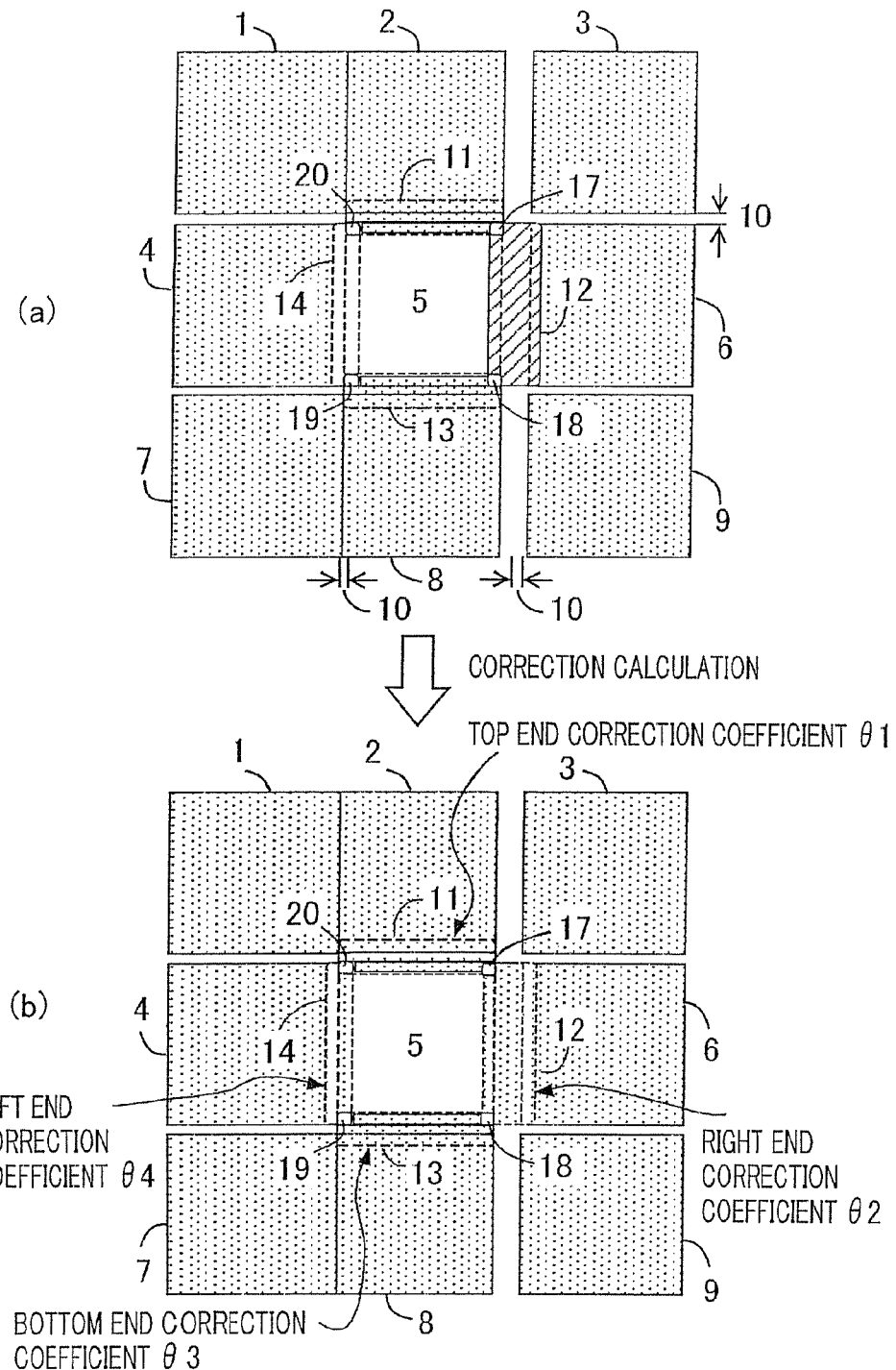
FIG. 1 is a conceptual diagram for explaining a video display apparatus according to Embodiment 1.

1 TO 9: VIDEO DISPLAY UNIT
10: STANDARD UNIT SPACING
11 TO 20 AND 110 TO 140: CORRECTION CALCULATION AREA
21 TO 24: SELECTOR
25: MULTIPLIER
26: PRESSURE SENSOR
31 TO 39: MODULE
40: STANDARD MODULE SPACING

BEST MODE FOR CARRYING OUT THE INVENTION

Embodiments of the present invention will be explained below with reference to the accompanying drawings.

The same reference characters in the figures denote the same or equivalent constituent elements.
Embodiment 1

In the case where there are arranged two or more video display units formed of a great number of light emitting display elements that are arranged in a dot-matrix manner (or simply refereed to as "in a matrix manner") on a substrate, when the spacing between adjacent video display units is too small or too large, a dark-and-bright linear noise appears at a place between the adjacent video display units.

Here, the spacing between video display units required to arrange the light emitting display elements in such a way as to be spaced apart from one another by a constant distance will be referred to as a standard unit spacing.

That is to say, in each of the video display units, a great number of light emitting display elements are spaced apart from one another by a constant distance; the "standard unit spacing" denotes a spacing required to arrange, at a place between adjacent video display units, light emitting display elements in such a way as to be spaced apart from each other by a constant distance by which light emitting display elements are spaced apart from one another in the video display unit, even in the case where a plurality of video display units is arranged.

FIG. 1 is a conceptual diagram for explaining a video display apparatus according to Embodiment 1.

Here, as an example, there will be explained a case where nine video display units are arranged in a matrix manner.

In addition, FIG. 1(a) illustrates a state in which a linear noise, caused at a place between adjacent video display units, has not been suppressed; FIG. 1(b) illustrates a state in which a linear noise, caused at a place between adjacent video display units, is suppressed.

In FIG. 1, reference numerals 1 to 9 denote video display units; these video display units are arranged in a matrix manner with the video display unit 5 disposed at the center.

In Embodiment 1, as an example, there will be explained a case where the video display unit 5 is disposed at the center and other video display units are arranged in a matrix manner in the vicinity of the video display unit 5.

In the example illustrated in FIG. 1, because the spacing between the video display unit 4 and the video display unit 5 is smaller than a standard unit spacing 10, a bright line is seen at the left edge of the video display unit 5.

In the example illustrated in FIG. 1, because the spacing between the video display unit 5 and the video display unit 6 is larger than the standard unit spacing 10, a dark line is seen at the right edge of the video display unit 5.

It is assumed that the spacing between the video display unit 5 and the video display unit 2, situated on the top of the video display unit 5, and the spacing between the video display unit 5 and the video display unit 8, situate under the video display unit 5, are each equal to the standard unit spacing 10, and no dark-and-bright linear noise is seen.

For example, in the case where, because the spacing between the video display unit 5 and the video display unit 4 is smaller than the standard unit spacing 10, a bright line is seen at a place between the video display unit 5 and the video display unit 4, the luminance value of video data situated in a correction calculation area 14 including the left end area of the video display unit 5 and the right end area of the video display unit 4 is corrected with a left end correction coefficient θ4 (θ4=1+α) in such a way that the bright line becomes dark. In this case (i.e., in the case where the luminance value of video data is corrected in such a way that the bright line becomes dark), α is smaller than zero.

By multiplying the video data situated in the correction calculation area 14 by the correction coefficient θ4, the luminance of the seam portion is reduced and a bright line that leads to a linear noise is made inconspicuous.

In addition, θ4 is a correction coefficient for correcting the luminance value of video data situated in the correction calculation area 14 at the left end of the video display unit 5; therefore, θ4 will be referred to as a "left end correction coefficient".

Additionally, for example, in the case where, because the spacing between the video display unit 5 and the video display unit 6 is larger than the standard unit spacing 10, a dark linear noise is seen at a place between the video display unit 5 and the video display unit 6, the luminance value of video data situated in a correction calculation area 12 including the right end area of the video display unit 5 and the left end area of the video display unit 6 is corrected with a right end correction coefficient θ2 (θ2=1+α) in such a way that the dark line becomes bright. In this case (i.e., in the case where the luminance value of video data is corrected in such a way that the dark line becomes bright), a is larger than zero.

By multiplying the video data situated in the correction calculation area 12 by the right end correction coefficient θ2, the luminance of the seam portion between the video display unit 5 and the video display unit 6 is raised and the dark line that leads to a linear noise is made inconspicuous.

In addition, θ2 is a correction coefficient for correcting the luminance value of video data situated in the correction calculation area 12 at the right end of the video display unit 5; therefore, θ2 will be referred to as a "right end correction coefficient".

Similarly, a top end correction coefficient θ1 for the boundary between the video display unit 5 and the video display unit 2 and a bottom end correction coefficient θ3 for the boundary between the video display unit 5 and the video display unit 8 are obtained through the following equations.

top end correction coefficient θ1=1+α bottom end correction coefficient θ3=1+α

In addition, θ1 is a correction coefficient for correcting the luminance value of video data situated in a correction calculation area 11 at the top end of the video display unit 5; therefore, θ1 will be referred to as a "top end correction coefficient".

Similarly, θ3 is a correction coefficient for correcting the luminance value of video data situated in a correction calculation area 13 at the bottom end of the video display unit 5; therefore, θ3 will be referred to as a "bottom end correction coefficient".

Here, it is assumed that, in the case where the spacing between the video display unit 5 and the video display unit 2 and the spacing between the video display unit 5 and the video display unit 8 are each equal to the standard unit spacing 10, α is equal to zero.

When α=0, the top end correction coefficient θ1 and the bottom end correction coefficient θ3 are each equal to 1.

Accordingly, neither the luminance of the video data situated in the correction calculation area 11 nor the luminance of the video data situated in the correction calculation area 13 is changed.

Figure 2:
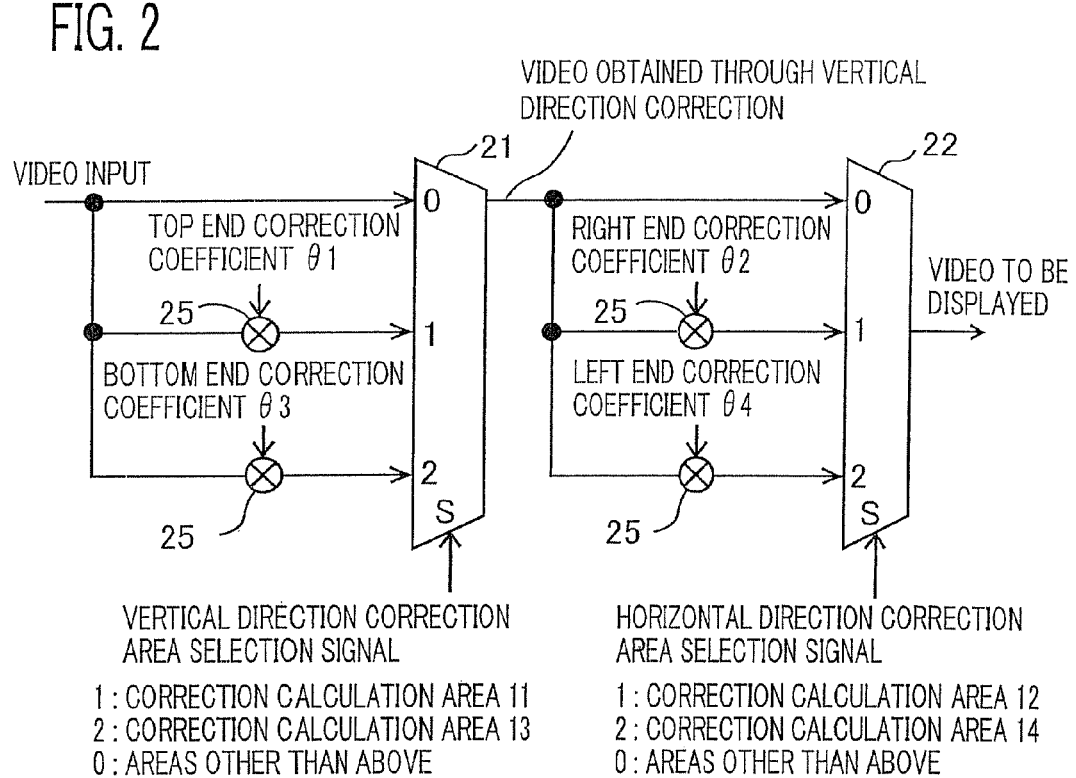
FIG. 2 is a diagram for explaining the operation of a video display apparatus according to Embodiment 1.

FIG. 2 is a diagram for explaining the operation of a video display apparatus according to Embodiment 1.

In Embodiment 1, as illustrated in FIG. 2, after being multiplied by vertical direction correction coefficients (i.e., θ1 and θ3), respective ramified video inputs are multiplied by horizontal direction correction coefficients (i.e., θ2 and θ4). In addition, reference numeral 25 denotes a multiplier.

By multiplying video data situated in the correction calculation area 11 by the top end correction coefficient θ1 and by multiplying video data situated in the correction calculation area 13 by the bottom end correction coefficient θ3, a linear noise that appears at the vertical direction seam portion can be suppressed.

In addition, the correction area (correction calculation area) to be multiplied by the correction coefficient is selected by the vertical direction correction area selector 21.

Next, with regard to video data (video data obtained by performing the vertical direction correction) in which video data in the vertical direction correction areas 11 and 13 has been corrected, by multiplying video data situated in the correction calculation area 12 by the right end correction coefficient θ2 and by multiplying video data situated in the correction calculation area 14 by the left end correction coefficient θ4, a linear noise that appears at the horizontal direction seam portion can be suppressed.

In addition, the correction calculation area to be multiplied by the correction coefficient is selected by the horizontal direction correction area selector 22.

The correction coefficient for the video data in the top right end correction calculation area 17 (refer to FIG. 1(*b*)) of the video display unit is obtained by multiplying the top end correction coefficient θ1 by the right end correction coefficient θ2.

Similarly, with regard to a bottom right end correction calculation area 18, the correction coefficient is obtained by multiplying θ2 by θ3; with regard to a bottom left end correction calculation area 19, the correction coefficient is obtained by multiplying θ3 by θ4; with regard to a top left end correction calculation area 20, the correction coefficient is obtained by multiplying θ1 by θ4.

In general, the area, in the periphery of the video display unit, to which correction is applied corresponds to a row of extremely edge pixels (light emitting display elements); however, by changing the area, the correction can be applied to video data situated in an area covering several rows beginning from the extremely edge row of the video display unit.

In Embodiment 1, as an example, there has been explained a case where nine video display units are arranged in a matrix manner; however, the number of the video display units is not limited to 9.

As described above, in a video display apparatus according to the present invention, the display screen thereof is configured by combining a plurality of video display units in each of which light emitting display elements are arranged in a matrix manner; the video display apparatus is provided with a luminance correction means that corrects the luminance of video data situated in respective correction subject areas (correction calculation areas), of a first video display unit and a second video display unit, that are end regions facing each other, in accordance with the spacing between the first video display unit and the second video display unit.

Moreover, in the case where, because the spacing between the adjacent first video display unit and the second video display unit is small, a bright linear noise is caused at a place between the first video display unit and the second video display unit, the luminance correction means reduces the luminance of the video data situated in the correction subject area; in the case where, because the spacing between the first video display unit and the second video display unit is large, a dark linear noise is caused at a place between the first video display unit and the second video display unit, the luminance correction means raises the luminance of the video data situated in the correction subject area.

In a video display method according to Embodiment 1, the display screen thereof is configured by combining a plurality of video display units in each of which light emitting display elements are arranged in a matrix manner; the video display method is to correct the luminance of video data situated in respective correction subject areas, of a first video display unit and a second video display unit, that are end regions facing each other, in accordance with the spacing between the first video display unit and the second video display unit.

In the case where, because the spacing between the adjacent first video display unit and the second video display unit is small, a bright linear noise is caused at a place between the first video display unit and the second video display unit, the luminance correction means reduces the luminance of the video data situated in the correction subject area; in the case where, because the spacing between the first video display unit and the second video display unit is large, a dark linear noise is caused at a place between the video first display unit and the second video display unit, the luminance correction means raises the luminance of the video data situated in the correction subject area.

Therefore, according to Embodiment 1, it is made possible to adjust the luminance of video data situated in respective correction subject areas (correction calculation areas), of adjacent first and second video display units, that are end regions facing each other, in accordance with the spacing between the adjacent first and second video display units; therefore, it is made possible to suppress a linear noise that is caused at a seam portion between the video display units, whereby the image quality of a video to be displayed can be raised.

Embodiment 2

In Embodiment 1 described above, there has been described a method of correcting the edge of a video display unit by use of a simple correction coefficient; however, with this method, it is difficult to apply a fine adjustment to the edge of a video display unit.

Thus, the spacing between adjacent video display units is measured, and by use of data obtained from the spacing measurement, the video data situated in the extremely edge area of the video display unit is corrected, so that a further accurate correction of the image quality can be performed.

Figure 3:
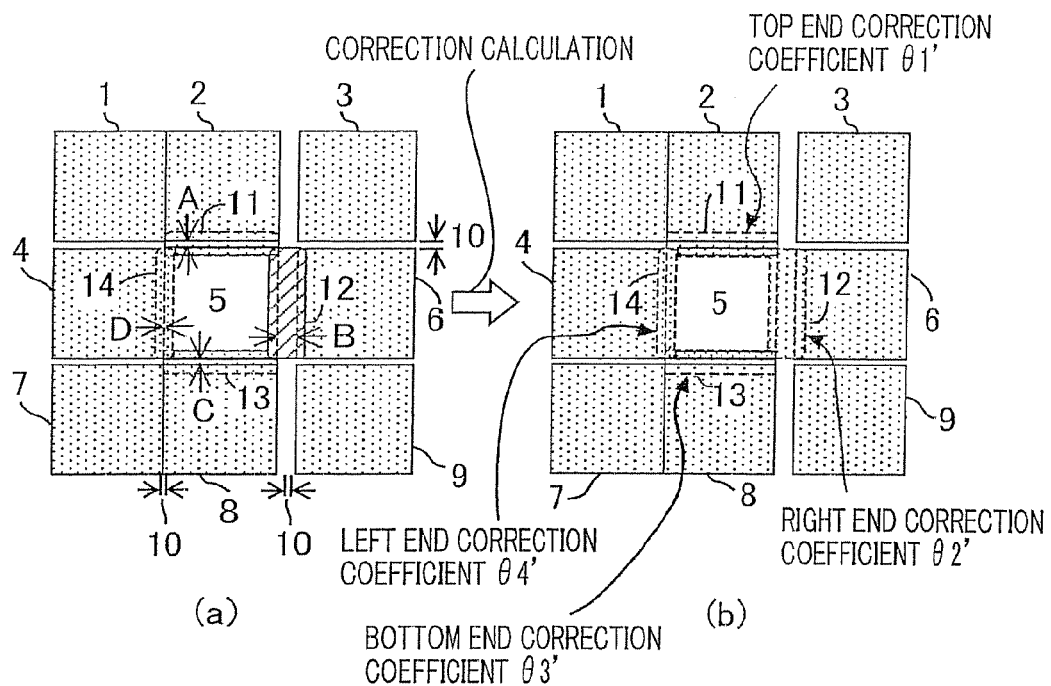
FIG. 3 is a conceptual diagram for explaining a video display apparatus according to Embodiment 2.

FIG. 3 is a conceptual diagram for explaining a video display apparatus according to Embodiment 2.

In addition, FIG. 3(a) illustrates a state in which a linear noise, caused at a place between adjacent video display units, has not been suppressed; FIG. 1(b) illustrates a state in which a linear noise, caused at a place between adjacent video display units, is suppressed.

In the example represented in FIG. 3, because the spacing between the video display unit 5 and the video display unit 4 is smaller than the standard unit spacing 10, a bright linear noise is seen at the left end of the video display unit 5.

In addition, because the spacing between the video display unit 5 and the video display unit 6 is larger than the standard unit spacing 10, a dark linear noise is seen at the right end of the video display unit 5.

It is assumed that the spacing between the video display unit 5 and the video display unit 2, situated on the top of the video display unit 5, and the spacing between the video display unit 5 and the video display unit 8, situate under the video display unit 5, are each equal to the standard unit spacing 10, and no linear noise is seen.

For example, in the case where, because the spacing between the video display unit 5 and the video display unit 4 is smaller than the standard unit spacing 10, a bright line is seen at a place between the video display unit 5 and the video display unit 4, the luminance value of video data situated in the correction calculation area 14 including the left end area of the video display unit 5 and the right end area of the video display unit 4 is corrected with a left end correction coefficient $\theta 4'$ ($\theta 4'=1+\alpha$) in such a way that the bright line becomes dark. In this case (i.e., in the case where the luminance value of video data is corrected in such a way that the bright line becomes dark), $\alpha$ is smaller than zero.

By multiplying the video data situated in the correction calculation area 14 by the correction coefficient $\theta 4'$, the luminance of the seam portion is reduced and a bright line is made inconspicuous.

As is the case with Embodiment 1, $\theta 4'$ is a correction coefficient for correcting the luminance value of video data situated in the correction calculation area 14 at the left end of the video display unit 5; therefore, $\theta 4'$ will be referred to as a "left end correction coefficient".

The left end correction coefficient $\theta 4'$ is obtained through the following equation, by use of a spacing D between the video display unit 5 and the video display unit 4.

left end correction coefficient $\theta 4'=1+\{(\text{spacing } D-\text{spacing } T)/(2\times\text{pixel pitch})\}$ Here, the spacing T denotes the standard unit spacing 10.

In this case, the left end correction coefficient $\theta 4'$ is the same as or smaller than one; by multiplying the video data, situated in the correction calculation area 14 including the extremely left end area of the video display unit 5 and the extremely right end area of the video display unit 4, by the correction coefficient, the luminance of the seam portion between the video display unit 5 and the video display unit 4 is reduced so that a bright line that leads to a linear noise is made inconspicuous.

In the case where, because the spacing between the video display unit 5 and the video display unit 6 is larger than the standard unit spacing 10, a dark linear noise is seen at a place between the video display unit 5 and the video display unit 6, the luminance value of video data situated in the correction calculation area 12 including the right end area of the video display unit 5 and the left end area of the video display unit 6 is corrected with a right end correction coefficient $\theta 2'$ ($\theta 2'=1+\alpha$) in such a way that the dark line becomes bright. In this case (i.e., in the case where the luminance value of video data is corrected in such a way that the dark line becomes bright), $\alpha$ is larger than zero.

By multiplying the video data situated in the correction calculation area 12 by the right end correction coefficient $\theta 2'$, the luminance of the seam portion is raised and a dark line that leads to a linear noise is made inconspicuous.

As is the case with Embodiment 1, $\theta 2'$ is a correction coefficient for correcting the luminance value of video data situated in the correction calculation area 12 at the right end of the video display unit 5; therefore, $\theta 2'$ will be referred to as a "right end correction coefficient".

The right end correction coefficient $\theta 2'$ is obtained through the following equation, by use of a spacing B between the video display unit 5 and the video display unit 6.

right end correction coefficient $\theta 2'=1+\{(\text{spacing } B-\text{spacing } T)/(2\times\text{pixel pitch})\}$ In addition, the spacing T denotes the standard unit spacing 10.

In this case, the right end correction coefficient $\theta 2'$ is the same as or larger than one; by multiplying the video data, situated in the correction calculation area 12 including the extremely right end area of the video display unit 5 and the extremely left end area of the video display unit 6, by the correction coefficient, the luminance of the seam portion between the video display unit 5 and the video display unit 6 is raised so that a dark line that leads to a linear noise is made inconspicuous.

Similarly, letting reference characters A and C denote the spacing between the video display unit 5 and the video display unit 2 and the spacing between the video display unit 5 and the video display unit 8, respectively, a top end correction coefficient $\theta 1'$ that is a correction coefficient for the video date situated in the correction calculation area 11 and a bottom end correction coefficient $\theta 3'$ that is a correction coefficient for the video date situated in the correction calculation area 13 are obtained through the following equations.

top end correction coefficient $\theta 1'=1+\{(\text{spacing } A-\text{spacing } T)/(2\times\text{pixel pitch})\}$ bottom end correction coefficient $\theta 3'=1+\{(\text{spacing } C-\text{spacing } T)/(2\times\text{pixel pitch})\}$ When the spacing A and the spacing C are each equal to the spacing T, which is the standard unit spacing, the top end correction coefficient $\theta 1$ and the bottom end correction coefficient $\theta 3'$ are each approximately one; thus, the respective luminances of the video data situated in the correction calculation areas 11 and 13 are not changed.

In the case where, even after corrections have been performed by use of the correction coefficients (i.e., $\theta 1'$ to $\theta 4'$) obtained through the foregoing equations, a linear noise at the seam portion can be seen, by, as represented in the following equations, adding an adjustment coefficient $\beta$ (i.e., $\beta 1$ to $\beta 4$) to each of the correction coefficients (i.e., $\theta 1'$ to $\theta 4'$), corrected final video data can be obtained.

top end correction coefficient $\theta 1''=\text{top end correction coefficient } \theta 1'+\beta 1$ right end correction coefficient $\theta 2''=\text{right end correction coefficient } \theta 2'+\beta 2$ bottom end correction coefficient $\theta 3''=\text{bottom end correction coefficient } \theta 3'+\beta 3$ left end correction coefficient $\theta 4''=\text{left end correction coefficient } \theta 4'+\beta 4$ In addition, in general, $\beta$ (i.e., $\beta 1$ to $\beta 4$) is zero. Through this processing, corrected final video data can be obtained.

Figure 4:
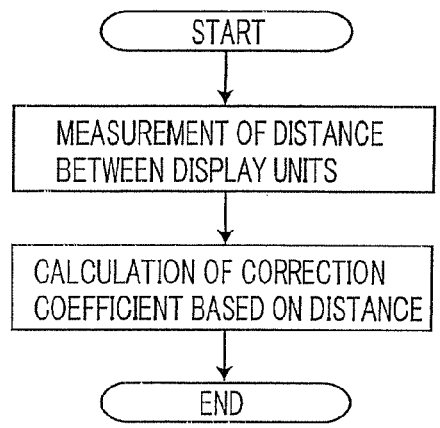
FIG. 4 is a flowchart representing processing steps in a video display apparatus according to Embodiment 2.

FIG. 4 is a flowchart representing processing steps in a video display apparatus according to Embodiment 2.

As represented in FIG. 4, in applying an image quality correction to a display video, the spacings A, B, C, and D between the video display units illustrated in FIG. 3(*a*) are preliminarily measured by use of a measurement apparatus such as a spacing gauge.

After that, as described above, by utilizing the measured spacings between the adjacent video display units, there are obtained the correction coefficient $\theta 1'$ for the video data situated in the correction calculation area 11, the correction coefficient $\theta 2'$ for the video data situated in the correction calculation area 12, the correction coefficient $\theta 3'$ for the video data situated in the correction calculation area 13, and the correction coefficient $\theta 4'$ for the video data situated in the correction calculation area 14.

As described above, the luminance correction means in the video display apparatus according to Embodiment 2 calculates the correction coefficient for correcting the luminance of the video data situated in a correction subject area (correction calculation area), based on measurement data on the spacing between the adjacent first and second video display units, and by use of the obtained correction coefficient, the luminance correction means corrects the luminance of the video data situated in the correction subject area.

Therefore, according to Embodiment 2, by utilizing measurement data on the spacings between adjacent video display units, a correction coefficient is calculated; thus, it is made possible to accurately suppress a linear noise that is caused at a seam portion between the video display units, whereby the image quality of a video to be displayed can be raised.

Embodiment 3

In addition, in Embodiment 2, there has been described a method of adjusting the image quality by use of a correction coefficient obtained based on the spacing between video display units; however, this method does not consider the accuracy error of a video display unit itself.

Figure 5:
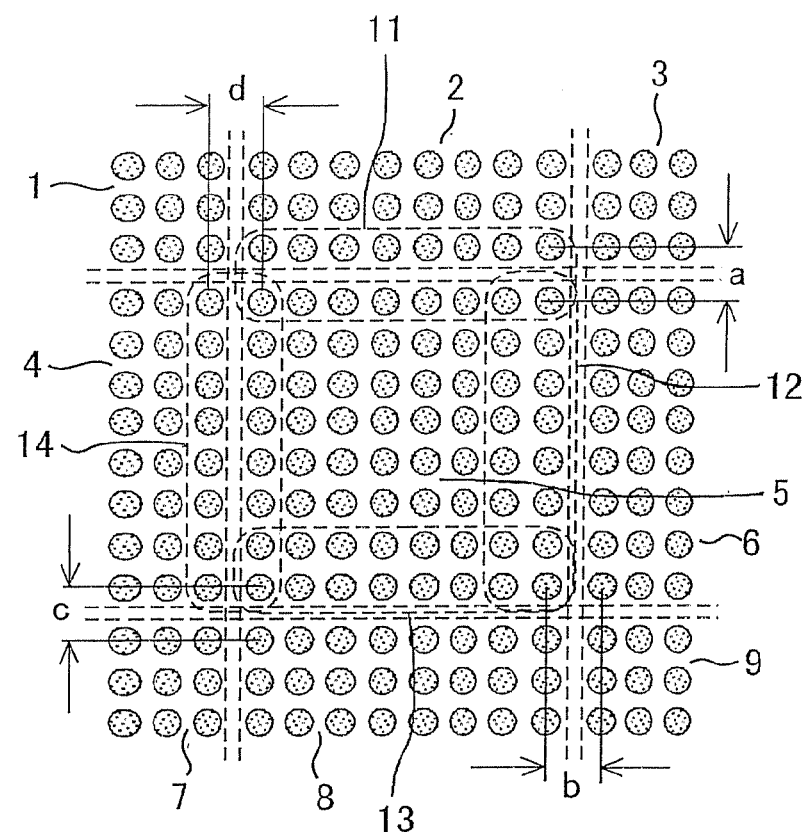
FIG. 5 is a conceptual diagram for explaining a video display apparatus according to Embodiment 3.

Accordingly, as illustrated in FIG. 5, by obtaining the distance between respective dots at the extremely end portions of adjacent video display units (the distance between facing rows of light emitting display elements) and calculating a correction coefficient, it is made possible to more accurately adjust the image quality, without being affected by the accuracy of the video display unit.

FIG. 5 is a conceptual diagram for explaining a video display apparatus according to Embodiment 3.

Embodiment 3 will be explained with reference to FIG. 5.

In FIG. 5, reference character "a" denotes the dot spacing between the row of light emitting display elements at the extremely top end of the video display unit 5 and the row of light emitting display elements at the extremely bottom end of the video display unit 2 (i.e., the distance between light emitting display elements); reference character "b" denotes the dot spacing between the row of light emitting display elements at the extremely right end of the video display unit 5 and the row of light emitting display elements at the extremely left end of the video display unit 6; reference character "c" denotes the dot spacing between the row of light emitting display elements at the extremely bottom end of the video display unit 5 and the row of light emitting display elements at the extremely top end of the video display unit 8; and reference character "d" denotes the dot spacing between the row of light emitting display elements at the extremely left end of the video display unit 5 and the row of light emitting display elements at the extremely right end of the video display unit 4.

At first, these dot spacings "a" to "d" are measured.

Next, by use of the measurement result and through the following equations, there are obtained a correction coefficient $\theta 1^*$ for the video data situated in the correction calculation area 11, a correction coefficient $\theta 2^*$ for the video data situated in the correction calculation area 12, a correction coefficient $\theta 3^*$ for the video data situated in the correction calculation area 13, and a correction coefficient θ4* for the video data situated in the correction calculation area 14.

top end correction coefficient θ1*=1/2+(dot spacing *a*/pixel pitch)

right end correction coefficient θ2*=1/2+(dot spacing *b*/pixel pitch)

bottom end correction coefficient θ3*=1/2+(dot spacing *c*/pixel pitch)

left end correction coefficient θ4*=1/2+(dot spacing *d*/pixel pitch)

As is the case with Embodiment 1, by multiplying the video data situated in a corresponding correction calculation area by the correction coefficient obtained through the above equation, corrected video data is obtained.

In addition, θ1* is a correction coefficient for correcting the luminance value of video data situated in the correction calculation area 11 at the top end of the video display unit 5; θ2* is a correction coefficient for correcting the luminance value of video data situated in the correction calculation area 12 at the right end of the video display unit 5; θ3* is a correction coefficient for correcting the luminance value of video data situated in the correction calculation area 13 at the bottom end of the video display unit 5; and θ4* is a correction coefficient for correcting the luminance value of video data situated in the correction calculation area 14 at the left end of the video display unit 5; therefore, θ1* is referred to as a top end correction coefficient; θ2* is referred to as a right end correction coefficient; θ3* is referred to as a bottom end correction coefficient; and θ4* is referred to as a left end correction coefficient.

In the case where, even after luminance corrections have been performed by use of the correction coefficients obtained through the foregoing equations, a linear noise at the seam portion can be seen, by, as represented in the following equations, adding an adjustment coefficient γ (γ1 to γ4) to each of the correction coefficients (θ1* to θ4*), corrected final video data can be obtained.

In this case, the top end correction coefficient θ1*, the right end correction coefficient θ2*, the bottom end correction coefficient θ3*, and the left end correction coefficient θ4* are obtained through the following equations.

top end correction coefficient θ1*'=top end correction coefficient θ1*+γ1 right end correction coefficient θ2*'=right end correction coefficient θ2*+γ2 bottom end correction coefficient θ3*'=bottom end correction coefficient θ3*+γ3 left end correction coefficient θ4*'=left end correction coefficient θ4*+γ4

Through the foregoing processing, corrected final video data can be obtained.

As described above, the luminance correction means in the video display apparatus according to Embodiment 3 calculates the correction coefficient for correcting the luminance of the video data, based on measurement data on the spacing between the rows, of light emitting display elements of the adjacent first and second video display units, that are facing each other, and by use of the obtained correction coefficient, the luminance correction means corrects the luminance of the video data situated in the correction subject area.

Accordingly, Embodiment 3 makes it possible to more accurately raise the image quality of a video to be displayed, without being affected by the accuracy of the video display unit.

Embodiment 4

In addition, in Embodiments 2 to 3, the measurement on the spacing between video display units is performed for each of the ends of a video display unit, by use of a measurement apparatus such as a spacing gauge; however, for example, sensors such as pressure sensors are provided on the top, bottom, left, and right sides of a video display unit so that the spacing is automatically measured, and based on the measured data, correction coefficients are calculated so as to be reflected on the luminances of the extremely end portions of a video display unit, whereby the spacing measurement and the image quality adjustment of the boundary portion of a video display unit can readily be performed; thus, the efficiency can be raised.

Figure 6:
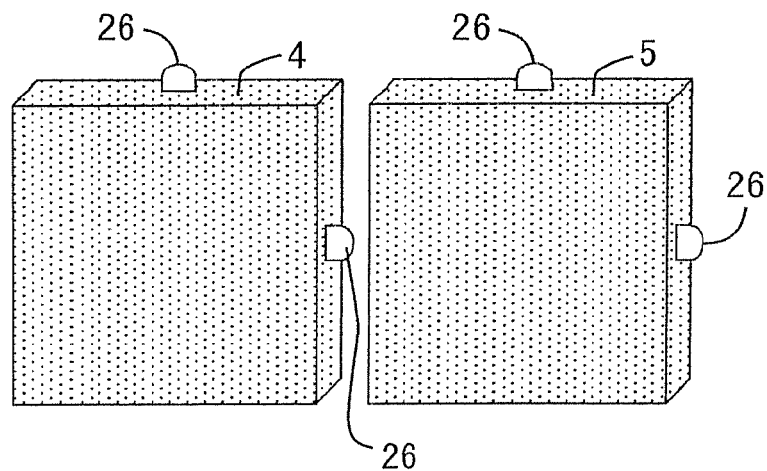
FIG. 6 is a conceptual diagram for explaining the configuration of a video display apparatus according to Embodiment 4.

FIG. 6 is a conceptual diagram for explaining the configuration of a video display apparatus according to Embodiment 4; FIG. 6 illustrates an example in which pressure sensors are mounted on a video display unit.

Pressure sensors 26 are arranged on the top and right sides of a video display unit.

For example, in the case where the video display units 4 and are arranged in a horizontal row, based on the fact that the pressure sensor 26 provided on the right side of the video display unit 4 is pressed by the video display unit 5, the spacing (distance) between the video display unit 4 and the video display unit 5 is measured.

That is to say, based on the pressure exerted on the pressure sensor, the spacing (distance) between the video display unit 4 and the video display unit 5 is obtained.

As a result, the spacing between adjacent video display units can automatically be measured; therefore, as is the case with Embodiment 2, based on the measurement data on the spacing, a correction coefficient for correcting the luminance of video data is calculated, and by use of the obtained correction coefficient, the luminance of the video data situated in a correction subject area is corrected.

As described above, in the video display apparatus according to Embodiment 4, the spacing between adjacent video display units is automatically measured through a sensor provided at a place between the adjacent first and second video display units; thus, luminance correction coefficients can readily be obtained.

Embodiment 5

In addition, in Embodiments 1 to 4, there has been described a case where image quality adjustment is applied only to a seam portion between video display units.

In Embodiment 5, by adjusting the luminance of a seam portion between modules in each of which two or more video display units are integrated, image quality adjustment can be performed.

Figure 8:
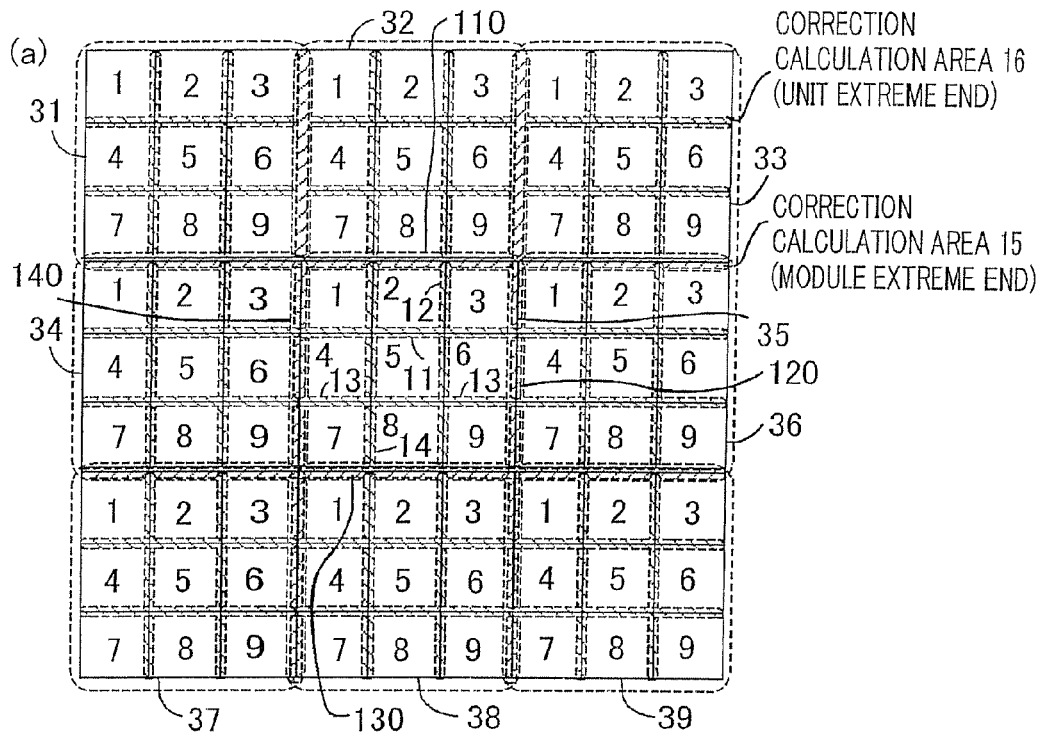
FIG. 8 is a conceptual diagram for explaining a method of calculating a correction coefficient for a module in a video display apparatus according to Embodiment 5.
Figure 8:
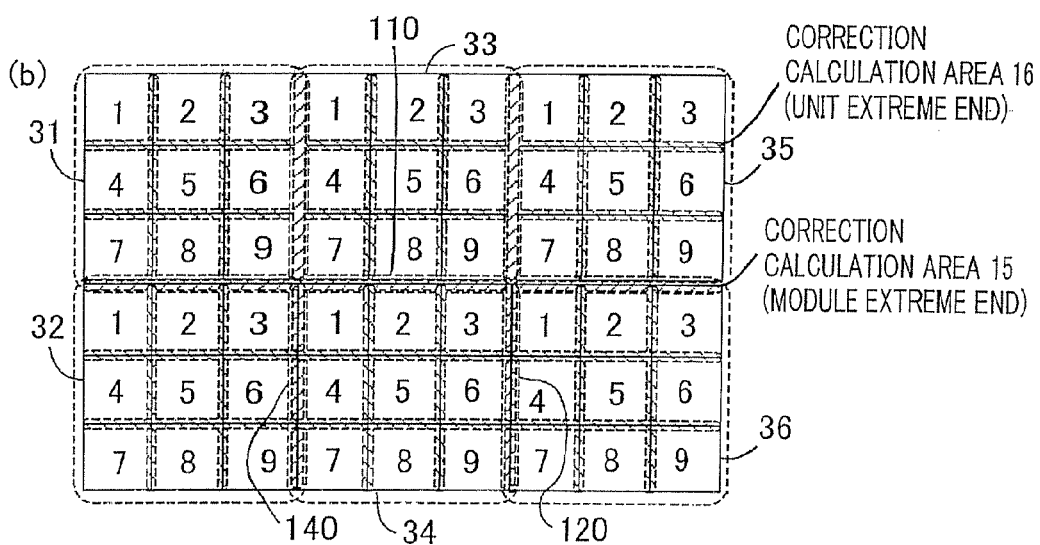

As illustrated in FIG. 8, transportable modules are often rearranged; therefore, the spacing between the modules is liable to be uneven.

Additionally, arbitrary modules are utilized in such a way as to be combined at arbitrary places; therefore, it is required to adjust the end portions of a module.

A video display apparatus according to Embodiment 5 will be explained below with reference to FIGS. 7 to 9.

Reference numerals 31 to 39 denote modules; the modules 31 to 39 are each configured, for example, with nine video display units 1 to 9.

In Embodiment 5, there will be explained a case where modules are arranged in a matrix manner in such a way as to surround the module 35 disposed at the center.

There can be changed the respective luminance values of a top end correction calculation area 110, a right end correction calculation area 120, a bottom end correction calculation area 130, and a left end correction calculation area 140 of the module 35.

Additionally, for an extremely end correction calculation area 15 in the extremely end video display units of a module, a correction coefficient for a module is obtained and utilized; for an extremely end correction area 16, of a video display unit, which is within a module, a correction coefficient for a video display unit is obtained and utilized (refer to FIG. 8).

Figure 7:
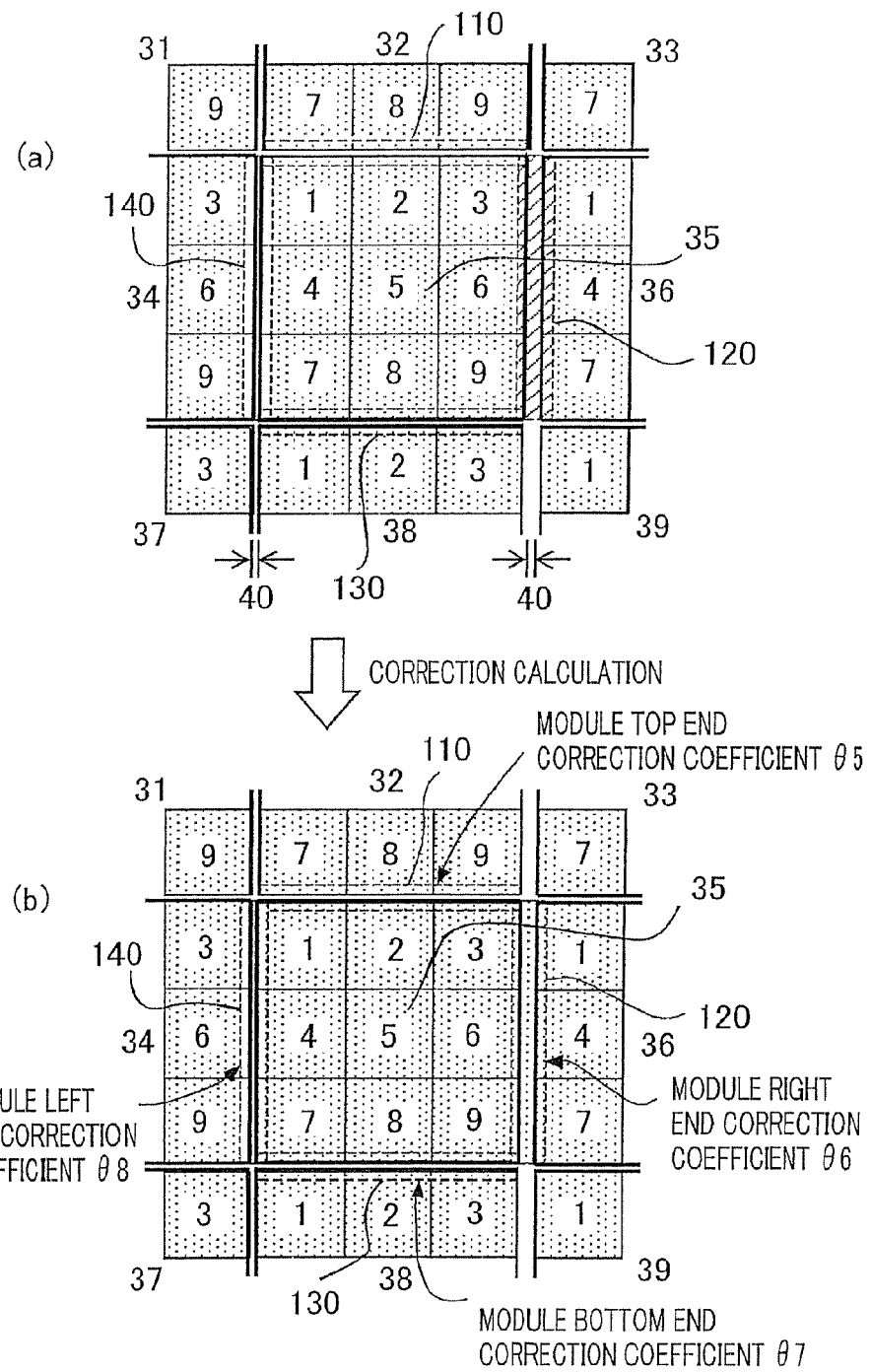
FIG. 7 is a conceptual diagram for explaining a method of calculating a correction coefficient for a module in a video display apparatus according to Embodiment 5.

FIG. 7 is a conceptual diagram for explaining a method of calculating a correction coefficient for a module.

In addition, FIG. 7(a) illustrates a state in which a linear noise, caused at a place between adjacent modules, has not been suppressed; FIG. 7(b) illustrates a state in which a linear noise, caused at a place between adjacent modules, is suppressed.

For example, in FIG. 7(a), because the spacing between the module 35 and the module 34 is smaller than a standard module spacing 40, a bright linear noise is seen at the left end of the module 35.

Additionally, because the spacing between the module 35 and the module 36 is larger than the standard module spacing 40, a dark linear noise is seen at the right end of the module 35.

In the case where, because the spacing between the module 35 and the module 34 is small, a bright linear noise is seen, the luminance value of video data situated in the correction calculation area 140 including the left end area of the module 35 and the right end area of the module 34 is corrected with a left end correction coefficient $\theta 8$ in such a way that the bright linear noise becomes dark. The left end correction coefficient $\theta 8$ is given by the following equation.

module left end correction coefficient $\theta 8 = 1 + \delta$

In this case, $\delta$ is smaller than zero.

By multiplying the video data, situated in the correction calculation area 140 including the left end area of the module 35 and the right end area of the module 34, by the correction coefficient $\theta 8$, the luminance of the seam portion between the module 35 and the module 34 is reduced so that a bright linear noise is made inconspicuous.

In the case where, because the spacing between the module 35 and the module 36 is large, a dark linear noise is seen, the luminance value of video data situated in the correction calculation area 120 including the right end area of the module and the left end area of the module 36 is corrected with a right end correction coefficient $\theta 6$ in such a way that the dark linear noise becomes bright. The module right end correction coefficient is given by the following equation.

module left end correction coefficient $\theta 6 = 1 + \delta$

In this case, $\delta$ is larger than zero.

By multiplying the video data, situated in the correction calculation area 120 including the right end area of the module 35 and the right end area of the module 36, by the right end correction coefficient $\theta 6$, the luminance of the seam portion between the module 35 and the module 36 is raised so that a dark linear noise is made inconspicuous.

Similarly, a module top end correction coefficient $\theta 5$ for the boundary between the module 35 and the module 32 (i.e., the correction calculation area 110) and a module bottom end correction coefficient $\theta 7$ for the boundary between the module 35 and the module 38 (i.e., the correction calculation area 130) are obtained through the following equations.

module top end correction coefficient $\theta 5 = 1 + \delta$ module bottom end correction coefficient $\theta 7 = 1 + \delta$ When $\delta = 0$, the top end correction coefficient $\theta 5$ and the bottom end correction coefficient $\theta 7$ are each equal to 1.

When $\theta 5$ and $\theta 7$ are each equal to 1, neither the luminance of the video data situated in the correction calculation area 110 nor the luminance of the video data situated in the correction calculation area 130 is changed.

As is the case with Embodiment 2, by measuring a spacing A' between the module 35 and the module 32, a correction coefficient (module top end correction coefficient) $\theta 5'$ for the top end correction calculation area 110 of the module 35 can be obtained.

module top end correction coefficient $\theta 5' = 1 + \{(\text{spacing } A' - \text{spacing } T')/(2 \times \text{pixel pitch})\}$ Here, the spacing T' denotes the standard module spacing 40.

Similarly, by utilizing a spacing B' between the module 35 and the module 36, which is on the right side of the module 35, a spacing C' between the module 35 and the module 38, which is beneath the module 35, and a spacing D' between the module 35 and the module 34, which is on the left side of the module 35, respective correction coefficients ($\theta 6'$, $\theta 7'$, and $\theta 8'$) for the left end correction calculation area 120 of the module 35, the bottom end correction calculation area 130 of the module 35, the left end correction calculation area 140 of the module 35 can be obtained through the following equations.

module right end correction coefficient $\theta 6' = 1 + \{(\text{spacing } B' - \text{spacing } T')/(2 \times \text{pixel pitch})\}$ module bottom end correction coefficient $\theta 7' = 1 + \{(\text{spacing } C' - \text{spacing } T')/(2 \times \text{pixel pitch})\}$ module left end correction coefficient $\theta 8' = 1 + \{(\text{spacing } D' - \text{spacing } T')/(2 \times \text{pixel pitch})\}$ The foregoing processing makes it possible to suppress a dark-and-bright linear noise that is caused at a seam portion between the modules.

In the case where modules are disassembled, by setting the correction coefficients $\theta 5$ to $\theta 8$ for the module to 1, the correction can be initialized.

In the case where the modules are rearranged so as to be utilized again, new correction coefficients for the extreme end video display units in a module are obtained and utilized.

Each time the modules are rearranged, the spacing between the modules changes. The correction coefficients for a module are set in accordance with module spacings that change each time modules are rearranged, so that a dark-and-bright linear noise at the seam portion between the modules can be suppressed.

FIG. 8 is a diagram for conceptually representing an adjustment, which is required due to rearrangement of modules, among video display units or among modules that are each configured with video display units.

By, as illustrated in FIG. 8, performing an adjustment among video display units or among modules that are each configured with video display units, image quality adjustment for the whole large-size display apparatus can be performed.

Figure 9:
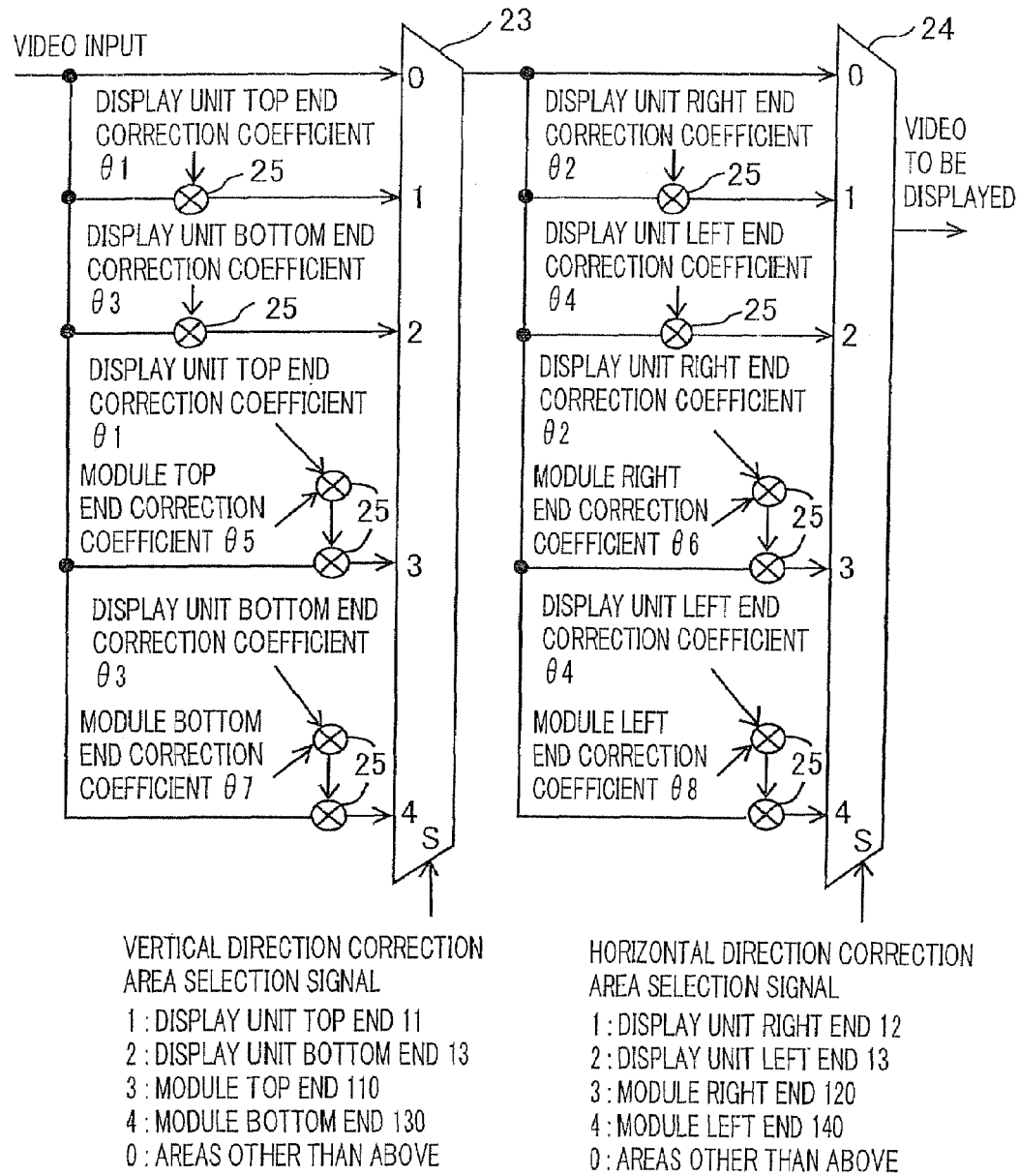
FIG. 9 is a diagram for explaining the operation of a video display apparatus according to Embodiment 5.

FIG. 9 is a diagram for explaining the operation of a video display apparatus according to Embodiment 5.

As illustrated in FIG. 9, after being multiplied by vertical direction correction coefficients, respective ramified video inputs are multiplied by horizontal direction correction coefficients.

The video data situated in the top end correction calculation area 11 of a video display unit is multiplied by the correction coefficient θ1; the video data situated in the bottom end correction calculation area 13 of the video display unit is multiplied by the correction coefficient θ3; the video data situated in the module top end correction calculation area 110 is multiplied by the correction coefficient θ5; and the video data situated in the module bottom end correction calculation area 130 is multiplied by the correction coefficient θ7. As a result, a linear noise that appears at a vertical direction seam portion can be suppressed. In addition, the area to be multiplied by the correction coefficient is selected by the vertical direction correction area selector 23.

Next, with regard to the video data that has been corrected in the vertical direction, the video data situated in the right end correction calculation area 12 of the video display unit is multiplied by the correction coefficient θ2; the video data situated in the left end correction calculation area 14 of the video display unit is multiplied by the correction coefficient θ4; the video data situated in the module right end correction calculation area 120 is multiplied by the correction coefficient θ6; and the video data situated in the module left end correction calculation area 140 is multiplied by the correction coefficient θ8. As a result, a linear noise that appears at a seam portion can be suppressed. The area to be multiplied by the correction coefficient is selected by the horizontal direction correction area selector 24.

The correction coefficient for the video data in the module extremely top right end correction calculation area is obtained by multiplying the module top end correction coefficient θ5 by the module right end correction coefficient θ6.

Similarly, the correction coefficient for the module extremely bottom right end correction calculation area is obtained by multiplying θ6 by θ7; the correction coefficient for the module extremely bottom left end correction calculation area is obtained by multiplying θ7 by θ8; and the correction coefficient for the module extremely top left end correction calculation area is obtained by multiplying θ5 by θ8.

As described above, in a video display apparatus according to Embodiment 5, the display screen thereof is configured by combining modules that are each configured with a plurality of video display units; the video display apparatus is provided with a luminance correction means that corrects the luminance of video data situated in a correction subject area including respective end regions, of a first module and a second module, that face each other, in accordance with the spacing between the first module and the second module.

In the case where, because the spacing between the adjacent first and second modules is small, a bright linear noise is caused at a place between the first and second modules, the luminance correction means reduces the luminance of the video data situated in the correction subject area; in the case where, because the spacing between the adjacent first and second modules is large, a dark linear noise is caused at a place between the first and second modules, the luminance correction means raises the luminance of the video data situated in the correction subject area.

Therefore, according to Embodiment 5, it is made possible to correct the luminance of video data situated in a correction subject area including respective end regions, of a first module and a second module, that face each other, in accordance with the spacing between the first module and the second module; therefore, it is made possible to suppress a linear noise that is caused at a seam portion between the modules, whereby the image quality of a video to be displayed can be raised.

Embodiment 6

Figure 10:
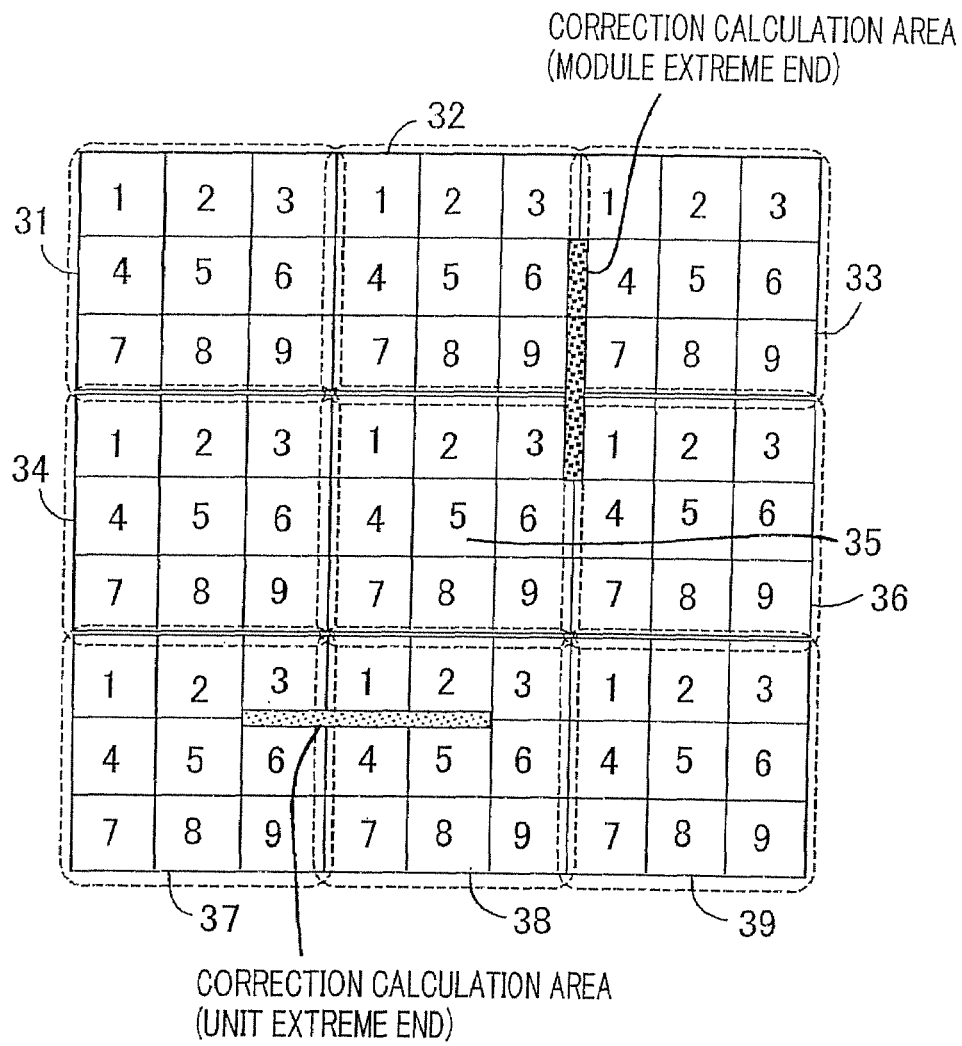
FIG. 10 is a conceptual diagram for explaining a video display apparatus according to Embodiment 6.

FIG. 10 is a conceptual diagram for explaining a video display apparatus according to Embodiment 6.

In a large-size video display apparatus that is configured with a plurality of video display units, respective addresses are set for the video display units.

The address of a video display unit and the end area, to be corrected, among four end areas of the video display unit are specified and a correction coefficient for the video data corresponding to that end area of the video display unit is set, so that a dark-and-bright linear noise that appears at a seam portion can be suppressed.

Moreover, by specifying the range of the address to which correction is applied, correction applied to a plurality of units or correction applied to a plurality of modules can be performed, as illustrated in FIG. 10; thus, a system for readily correcting a luminance can be configured.

As described above, in the video display apparatus according to Embodiment 6, by setting the respective addresses for video display units or modules and specifying the range of the addresses, luminance correction over a plurality of video display units or modules is performed.

Industrial Applicability

The present invention is useful for realizing a video display apparatus capable of reducing a linear noise that appears at a seam portion between video display units or modules.

The invention claimed is:

1. A video display apparatus comprising a display screen of which is configured by combining a plurality of video display units in each of which light emitting display elements are arranged in a matrix manner, wherein there is provided a luminance correction means that corrects the luminance of video data situated in a correction subject area including respective end regions, of a first video display unit and a second video display unit, that face each other, in accordance with a spacing between the first video display unit and the second video display unit, wherein, by setting respective addresses for each of the plurality of video display units and specifying a range of the set addresses, luminance correction over the plurality of video display units is performed, and wherein, when the spacing between the adjacent first and second video display units is smaller than a standard unit spacing, a bright linear noise is caused at a place between the first video display unit and the second video display unit, the luminance correction means reduces the luminance of video data situated in the correction subject area; and when the spacing between the first video display unit and the second video display unit is larger tan a standard unit spacing, a dark linear noise is caused at a place between the first video display unit and the second video display unit, the luminance correction means raises the luminance of video data situated in the correction subject area.

2. The video display apparatus according to claim 1, wherein the luminance correction means calculates a correction coefficient for correcting the luminance of video data situated in the correction subject area, based on measurement data on the spacing between the adjacent first and second video display units, and by use of the obtained correction coefficient, the luminance correction means corrects the luminance of video data situated in the correction subject area.

3. The video display apparatus according to claim 2, wherein the measurement data on the spacing between the adjacent first and second video display units is measurement data on the spacing between rows, of light emitting display elements of the adjacent first and second video display units, that face each other.

4. The video display apparatus according to claim 2, wherein the measurement data on the spacing between the adjacent first and second video display units is obtained through measurement performed by use of a pressure sensor provided at a place between the adjacent first and second video display units.

5. A video display apparatus comprising a display screen of which is configured by combining modules that are each configured with a plurality of video display units, wherein there is provided with a luminance correction means that corrects the luminance of video data situated in a correction subject area including respective end regions, of a first module and a second module, that face each other, in accordance with a spacing between the first module and the second module,
  wherein, by setting respective addresses for the plurality of video display units and specifying a range of the set addresses, luminance correction the plurality of video display units is performed, and
  wherein, when the spacing between the adjacent first and second video display units is smaller than a standard unit spacing, a bright linear noise is caused at a place between the first video display unit and the second video display unit, the luminance correction means reduces the luminance of video data situated in the correction subject area; and when the spacing between the first video display unit and the second video display unit is larger tan a standard unit spacing, a dark linear noise is caused at a place between the first video display unit and the second video display unit, the luminance correction means raises the luminance of video data situated in the correction subject area.

6. A video display method in which a display screen is configured by combining a plurality of video display units in each of which light emitting display elements are arranged in a matrix manner, wherein the luminance of video data situated in a correction subject area including respective end regions, of a first video display unit and a second video display unit, that face each other, in accordance with a spacing between the first video display unit and the second video display unit,
  wherein, by setting respective addresses for the plurality of video display units and specifying a range of the set addresses, luminance correction over the plurality of video display units is performed, and
  wherein, when the spacing between the adjacent first and second video display units is smaller than a standard unit spacing, a bright linear noise is caused at a place between the first video display unit and the second video display unit, the luminance correction means reduces the luminance of video data situated in the correction subject area; and when the spacing between the first video display unit and the second video display unit is larger tan a standard unit spacing, a dark linear noise is caused at a place between the first video display unit and the second video display unit, the luminance correction means raises the luminance of video data situated in the correction subject area.

7. A video display method in which a display screen is configured by combining modules that are each configured with a plurality of video display units, wherein there is corrected the luminance of video data situated in a correction subject area including respective end regions, of a first module and a second module, that face each other, in accordance with a spacing between the first module and the second module,
  wherein by setting respective addresses for the plurality of video display units and specifying a range of the set addresses, luminance correction over the plurality of video display units is performed, and
  wherein, when the spacing between the adjacent first and second video display units is smaller than a standard unit spacing, a bright linear noise is caused at a place between the first video display unit and the second video display unit, the luminance correction means reduces the luminance of video data situated in the correction subject area; and when the spacing between the first video display unit and the second video display unit is larger tan a standard unit spacing, a dark linear noise is caused at a place between the first video display unit and the second video display unit, the luminance correction means raises the luminance of video data situated in the correction subject area.

* * * * *